UNITED STATES PATENT OFFICE.

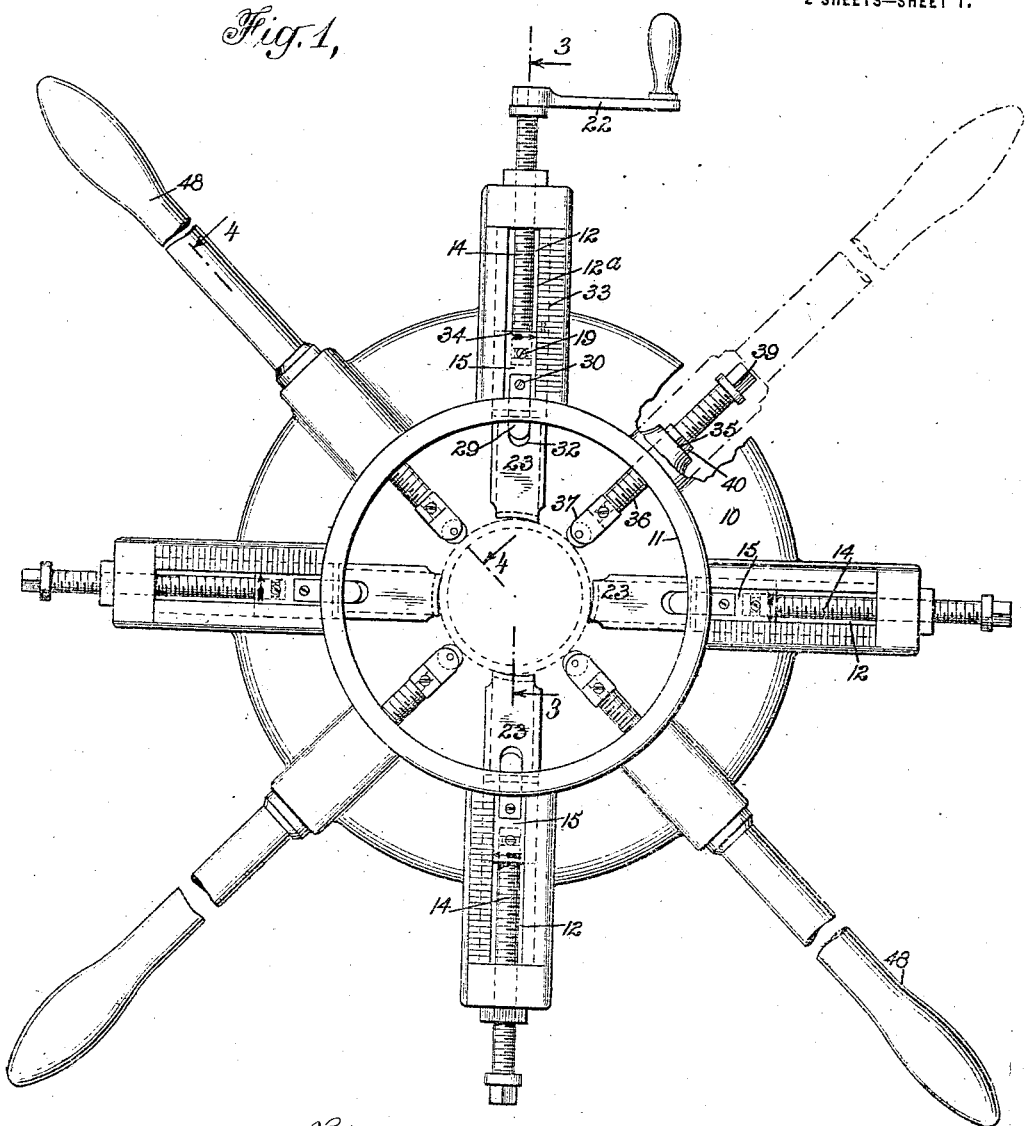
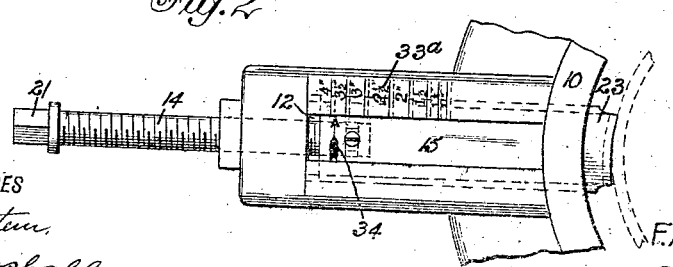

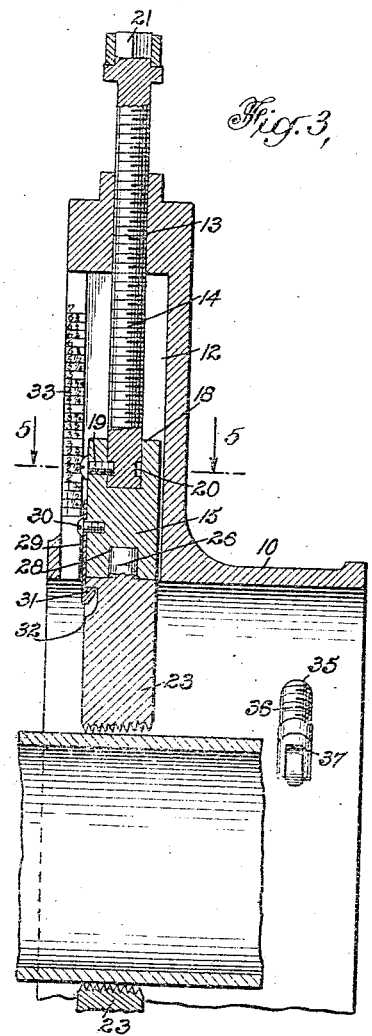
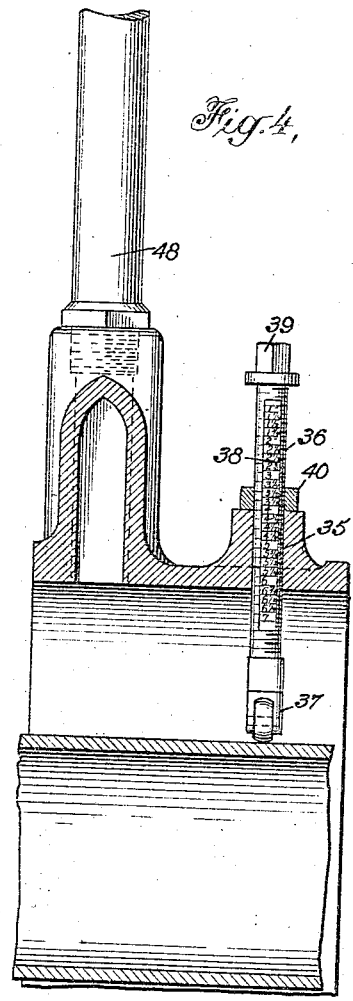
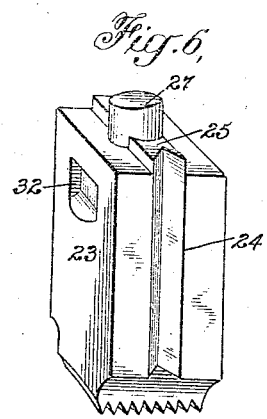
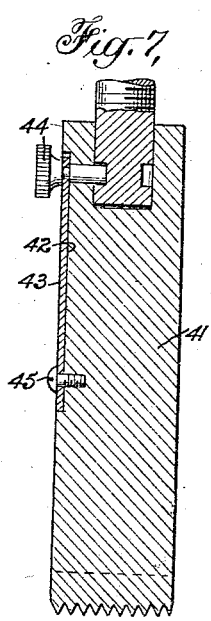
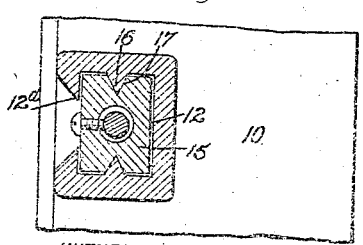
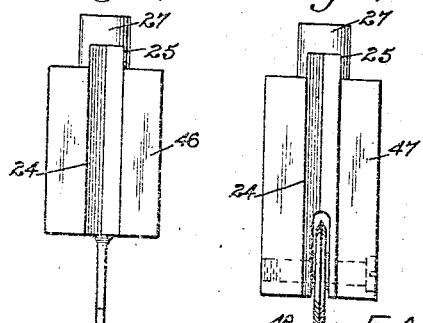
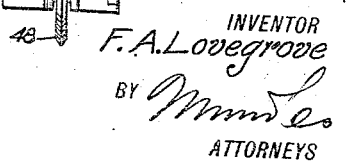

FRANCIS AUGUSTUS LOVEGROVE, OF HALIFAX, NOVA SCOTIA, CANADA.

PIPE THREADING AND CUTTING MACHINE.

1,244,996.    Specification of Letters Patent.    Patented Oct. 30, 1917.

Application filed March 21, 1917. Serial No. 156,353.

*To all whom it may concern:*

Be it known that I, FRANCIS A. LOVE-GROVE, a subject of the King of Great Britain, and a resident of Halifax, Nova Scotia, Canada, have invented a new and Improved Pipe Threading and Cutting Machine, of which the following is a full, clear, and exact description.

My invention has for its object to provide an inexpensive pipe threading and cutting machine which is simple and light in construction. The machine is strong, and may be used to advantage either as a threading or as a cutting machine, it being possible to mount either cutters or dies in the machine, as may be desired.

Additional objects of the invention will appear in the following specification, in which the preferred form of the invention is disclosed.

In the drawings, similar reference characters denote similar parts in all the views, in which—

Figure 1 is a view showing my machine in elevation;

Fig. 2 is an enlarged fragmentary view illustrating the manner of determining the position of the cutters relatively to the axis of the machine;

Fig. 3 is an enlarged sectional view on the line 3—3 of Fig. 1;

Fig. 4 is an enlarged sectional view on the line 4—4 of Fig. 1;

Fig. 5 is a sectional view on the line 5—5 of Fig. 3;

Fig. 6 is a perspective view showing one of the dies;

Fig. 7 is a sectional view illustrating a block and a die in one piece and showing the means by which the block is mounted on the screw; and Figs. 8 and 9 are views illustrating types of cutters which may be employed in the machine.

By referring to the drawings, it will be seen that a frame 10 is provided having a central opening 11 and a plurality of guideways 12 extending radially therefrom. The frame 10 at the outer end of each of these radial guideways is provided with a threaded orifice 13 in which a screw 14 meshes, the said screws being provided for moving blocks 15 radially, these blocks being provided for carrying dies or cutters, as may be desired.

At opposite sides of each of the guideways 12 there are guides 16 which project inwardly from the frame 10, these guides being disposed in recesses 17 at the sides of the blocks 15. The radial guideways 12 and the blocks 15 are also rectangular in cross-section, this means, together with the recesses 17 serving to prevent any rotary movement of the blocks 15 relatively to the frame 10. There are recesses 18 in the upper surfaces of the blocks 15, and in these recesses 18 the lower ends of the screws 14 are disposed, set screws 19 which are disposed in threaded orifices in the blocks 15, having their inner ends disposed in annular recesses 20 in the screws 14, this means permitting the rotary movement of the screws 14 relatively to the blocks 15, while making certain that the blocks 15 will be moved radially with the screws 14. The outer ends of the screws 14 are angular at 21 so that a crank or key 22 may be used to rotate the screws 14 to move the blocks 15 radially as may be desired.

As has been stated, dies or cutters may be mounted on the blocks 15 to thread or cut a pipe, as occasion may require. In Fig. 6 of the drawings, I illustrate a die which is adapted to be attached to the block 15, this die 23 having recesses 24 at its sides which will correspond with the recesses 17 in the block 15, so that the guides 16 will fit the recesses 24 when the die 23 is raised. The die 23 is also rectangular in shape, so that it will fit the guideway 12 in the same manner as the block 15. The die 23 has a rim 25 which extends upwardly from the top of the die, this rim 25 fitting a groove 26 in the bottom of the block 15. The die 23 also has a pin 27 which projects upwardly from the rim 25, this pin 27 fitting in an orifice 28 in the block. It will, therefore, be seen that the die 23 is held against rotation or lateral movement relatively to the block 15 when the die 23 is held upwardly with its rim 25 and its pin 27 in engagement with the groove 26 and the orifice 28 in the block. A spring clamp 29 is provided for holding the die 23 in the said position, this spring 29 being secured to the block 15 by means of a screw 30 and having a head 31 which normally fits in the recess 32 in the face of the die. By drawing out the head 31 from the recess 32, the die 23 may be moved downwardly and free from the block 15, after which another die 23, or a cutter, may be substituted, and may be secured in position.

In order to determine the position of the die relatively to the axis of the central opening 11 in the frame 10, a scale 33 is indicated on the frame 10 at the sides of openings 12ª in the frame, which lead to the radial guideways 12. There is a mark 34 on each of the blocks 15, which, in connection with the scale, assists the operator in determining the position of the block and the cutter relatively to the frame. In Fig. 2 of the drawings there will be found indicated at 33ª United States standard pipe scale, while in Fig. 3 of the drawings the ordinary scale is indicated.

There are radial threaded orifices 35 in the frame 10, disposed substantially in the same transverse plane, the said plane being disposed in the rear of the transverse plane of the guideways 12, screws 36 being provided which mesh in the threaded orifices. Casters 37 are mounted on the inner ends of these screws 36, so that the said casters may engage the pipe which is to be cut, and hold it in position while the cutting process takes place. The casters 37 will rotate relatively to the screw 36, and be disposed in proper position no matter how the screws 36 may be adjusted. A scale 38 is indicated on each of the screws 36, so that the positions of the casters 37 may be adjusted as well as the positions of the dies 23 relatively to the axis of the central opening 11 in the frame 10, for engagement with a pipe of predetermined diameter. The outer end of each of the screws 36 is angular in shape, as shown at 39, which permits the turning of the screws 36 by the key or crank 22. A lock nut 40 is preferably mounted on the screw 36 to lock the screw 36 in position after adjustment.

In Fig. 7 I illustrate a block and die in one piece, the combined block and die 41 being secured to a screw 14 in the same manner as the block 15 is secured to the said screw, there being preferably a recess 42 in the combined block and die 41 in which a member 43 is disposed which is mounted on a stud 44, which is used instead of the screw 19, for the purpose which has been described, the lower end of the member 43 being secured to the combined block and die 41 by means of a screw 45.

In Fig. 8 of the drawings, I illustrate a cutter which is indicated by the reference character 46, for use in cutting soft material, such as brass; another cutter 47 being illustrated in Fig. 9 of the drawings which is provided with a cutting wheel 48. The cutters 46 and 47 are provided with the recesses 24, the rims 25, the pins 27, and the recesses 32, so that they may be attached to the block 15 in the same manner as has been described with reference to the die 23.

Handles 48 extend radially from the frame 10 by which means the frame with the dies or cutters may be rotated.

Having thus described my invention, I claim as new and desire to secure by Letters Patent:

1. In a pipe threading and cutting machine, a frame having a central opening and a radial guideway extending therefrom, there being a threaded orifice at the outer end of the guideway, a block for moving in the guideway, a screw articulated to the block and meshing in the threaded orifice, there being a transverse groove in the bottom of the block and an orifice extending inwardly therefrom, a cutter having a transverse rim fitting the transverse groove in the block and a pin extending therefrom which fits the orifice in the block, and a clamp for holding the cutter in position relatively to the block.

2. In a pipe threading and cutting machine, a frame having a central opening and a radial guideway extending therefrom, there being a threaded orifice at the outer end of the guideway, a block for moving in the guideway, a screw articulated to the block and meshing in the threaded orifice, a cutter, means at the bottom of the block and at the top of the cutter to prevent lateral movement of the cutter relatively to the block, and a clamp for securing the cutter up in position against the block.

3. In a pipe threading and cutting machine, a frame having a central opening and a radial guideway extending therefrom, there being a threaded orifice at the outer end of the guideway, a block for moving in the guideway, a screw articulated to the block and meshing in the threaded orifice, a cutter, means at the bottom of the block and at the top of the cutter to prevent lateral movement of the cutter relatively to the block, there being a recess in the block, and a spring clamp secured to the block and disposed in the recess.

4. In a pipe threading and cutting machine, a frame having a central opening and a radial guideway extending therefrom, there being a threaded orifice in the frame at the outer end of the guideway, a block for moving in the guideway, a screw articulated to the block and meshing in the threaded orifice, a cutter, means at the bottom of the block and at the top of the cutter to prevent lateral movement of the cutter relatively to the block, there being a recess in the block, a spring clamp secured to the block and disposed in the recess, and guide means at the inner sides of the guideway and at the outer sides of the block to prevent rotary movement of the block relatively to the guideway.

5. In a pipe threading and cutting machine, a frame having a central opening with radial guideways extending therefrom, blocks having cutters for moving in the guideways, means for moving the blocks in the guideways to desired positions, there being threaded orifices in the frame spaced from the radial guideways longitudinally of the frame, screws meshing in the threaded orifices, and casters mounted on the screws.

6. In a pipe threading and cutting machine, a frame having a central opening with radial guideways extending therefrom, blocks having cutters for moving in the guideways, means for moving the blocks in the guideways to desired positions, there being threaded orifices in the frame spaced from the radial guideways longitudinally of the frame, screws meshing in the threaded orifices, casters mounted on the screws, scales on the frame at the guideways, and scales on the screws for indicating the positions of the blocks and the positions of the screws relatively to the axis of the central opening.

FRANCIS AUGUSTUS LOVEGROVE.